United States Patent [19]

Tsujihashi et al.

[11] Patent Number: 5,142,490
[45] Date of Patent: Aug. 25, 1992

[54] MULTIPLICATION CIRCUIT WITH STORING MEANS

[75] Inventors: Yoshiki Tsujihashi; Kazuhiro Sakashita, both of Itami, Japan

[73] Assignee: Mitsubishi Denki Kabushiki Kaisha, Tokyo, Japan

[21] Appl. No.: 617,440

[22] Filed: Nov. 19, 1990

Related U.S. Application Data

[63] Continuation of Ser. No. 302,719, Jan. 27, 1989, abandoned.

[30] Foreign Application Priority Data

Oct. 18, 1988 [JP] Japan .................. 63-261914

[51] Int. Cl.$^5$ .............................................. G06F 7/52
[52] U.S. Cl. .................................................. 364/757
[58] Field of Search ......................... 364/754–760, 364/784

[56] References Cited

U.S. PATENT DOCUMENTS

| | | | |
|---|---|---|---|
| 4,736,335 | 4/1988 | Barkan | 364/754 |
| 4,791,601 | 12/1988 | Tanaka | 364/760 |
| 4,831,577 | 5/1989 | Wei et al. | 364/760 |
| 4,887,233 | 12/1989 | Cash et al. | 364/757 |

FOREIGN PATENT DOCUMENTS 58-31449 2/1983 Japan .

OTHER PUBLICATIONS

S. Waser et al., "Real Time Processing Gains Ground with Fast Digital Multiplier", Electronics, Sep. 29, 1977, pp. 93–99.

Primary Examiner—Long T. Nguyen
Attorney, Agent, or Firm—Townsend and Townsend

[57] ABSTRACT

The multiplication circuit is formed in such a manner that the intermediate sums of partial products are divided into a lower places group and a higher places group and the operations for obtaining the products of the lower places group alone of the intermediate sums already found are carried out parallel to the processing for obtaining the higher places group of the intermediate sums to obtain the higher products thereafter, noting to the fact that the intermediate sums of partial products are found sequentially from lower places to higher places. By adopting such an arrangement, the operations for obtaining the higher places group of the intermediate sums can be processed in parallel with the operations for obtaining the products of the lower places group of the intermediate sums already found, and the higher products are found thereafter. Therefore, the time required for the former-stage processing and that required for the latter-stage processing can be made more uniform.

3 Claims, 2 Drawing Sheets

1

MULTIPLICATION CIRCUIT WITH STORING MEANS

This is a continuation of application Ser. No. 07/302,719, filed Jan. 27, 1989, now abandoned.

BACKGROUND OF THE INVENTION

1. Field of the Invention

The present invention relates to a multiplication circuit, and more in particular, to a multiplication circuit wherein the operational processing is pipelined.

2. Description of the Prior Art

FIG. 1 is a block diagram showing an arrangement of an 8 bits×8 bits secondary Booth's multiplier wherein applied is the arrangement of a multiplier as disclosed in Japanese Patent Application Laid-Open No. 58-31449 (1983).

In FIG. 1, the numeral 1 denotes a first adding circuit for calculating the intermediate sums of partial products, while a numeral 3 a first storing circuit for storing the output from the first adding circuit 1.

A numeral 2 denotes a second adding circuit. Here the product output is calculated from the outputs from the first adding circuit 1 stored in the first storing circuit 3, namely, the outputs of the intermediate sums, as inputs. The product output from the second adding circuit 2, that is, the multiplication result is stored in a second storing circuit 4.

Both the first adding circuit 1 and the second adding circuit 2 comprise plural number of adders. In the drawing, characters HA and FA denote a half adder and a full adder respectively.

The operations of such a conventional multiplication circuit are as follows.

In FIG. 1, four partial products $P_{i8} P_{i7} \ldots P_{i0}$ (where i equals to 0, 1, 2, 3) found in accordance with Booth's algorithm are added in the first adding circuit 1 to obtain $S_j$, $C_j$ (j=0~14), the outputs of the intermediate sums of the partial products. Thus found outputs of the intermediate sums are temporarily stored in the first storing circuit 3. Then the signals for the intermediate sums $S_j$ are added, while the carry signals $C_j$ are sequentially transmitted to the adjacent higher place between the half adders and full adders constituting the second adding circuit 2, to obtain the product output Zk (k=0~15), which is stored in the second storing circuit 4. This product output Zk is the multiplication result.

Therefore, in such a construction, it is possible that the partial products outputs found in the first adding circuit 1 are temporarily stored in the first storing circuit 3 and the next operation is executed in the first adding circuit 1, while the operations for obtaining this product output are being carried out in the second adding circuit 2. That is, it is possible to increase the operational efficiency by the pipelined processing of the multiplication at two stages, first in the first adding circuit 1 and, second in the second adding circuit 2.

The generating operations of the partial products and the operations in the first adding circuit 1 are hereinafter called the former-stage operations, while the operations in the second adding circuit 2 the latter-stage operations.

Among the signal transmitting paths leading to the output signals $S_j$, $C_j$ in the former-stage operations, the longest are those of $S_6$ to $S_{10}$ and $C_7$ to $C_{11}$. Three adders (HA, FA) are provided on each of these paths. The paths leading to other output signals are shorter than the paths just referred to. Consequently, generated are differences in delayed time caused by the existence of adders (HA, FA) provided on the signal paths.

On the other hand, the output signal Zk in the latter-stage operations is found, carrying sequentially from higher places to lower ones. Therefore, the greater k is, the more time it requires in determining the value. For this reason, as the number of the half adders and the full adders constituting the second adding circuit 2, that is, the number of places of the multiplication numbers increases, it takes more time in carrying out the latter-stage operations.

Thus in a multiplication circuit wherein Booth's algorithm is utilized, more time is required in carrying out the latter-stage operations than in carrying out the former-stage operations. Consequently, the cycle is forced to be dependent on the time required for carrying out the latter-stage operations when the operations are carried out in the two-staged pipeline wherein one stage is assigned to each of the former-stage operations and the latter-stage operations.

Thus arranged is a conventional multiplication circuit. Therefore, the degree of parallel of operations remains on a low level, and there is a room for further improvements in shortening the entire processing time. Furthermore, in the latter-stage operations, if the number multiplied is n bit×n bit, transmissions of the carry signals are caused 2n−1 times to require more time than in the former-stage operations. Consequently, the cycle for the pipelined processing is forced to be dependent on the time required for the latter-stage operations when the two-staged pipelined processing is carried out. As a result, there arises a problem that the entire efficiency in carrying out the processing is lowered.

SUMMARY OF THE INVENTION

The present invention has been made in view of the problems as mentioned above, and intends to provide a multiplication circuit wherein the time needed for a cycle of the pipelined processing can be shortened by increasing the degree of parallel in operations and reducing the difference between the time required for the former-stage processing and that required for the latter-stage processing when a pipelined processing is carried out.

The multiplication circuit according to the present invention is formed in such a manner that the intermediate sums are divided into a lower places group and a higher places group and the operations for obtaining the products of the lower places group alone of the intermediate sums already found are carried out parallel to the processing for obtaining the higher places group of the intermediate sums to obtain the higher products thereafter, noting to the fact that the intermediate sums of partial products are found sequentially from lower places to higher places. By adopting such an arrangement, the operations for obtaining the higher places group of the intermediate sums can be processed in parallel with the operations for obtaining the products of the lower places group of the intermediate sums already found, and the higher products are found thereafter. Therefore, the time required for the former-stage processing and that required for the latter-stage processing can be made more uniform.

The above and further objects and features of the invention will more fully be apparent from the following detailed description with accompanying drawings.

DESCRIPTION OF THE PREFERRED EMBODIMENTS

Figure 1:
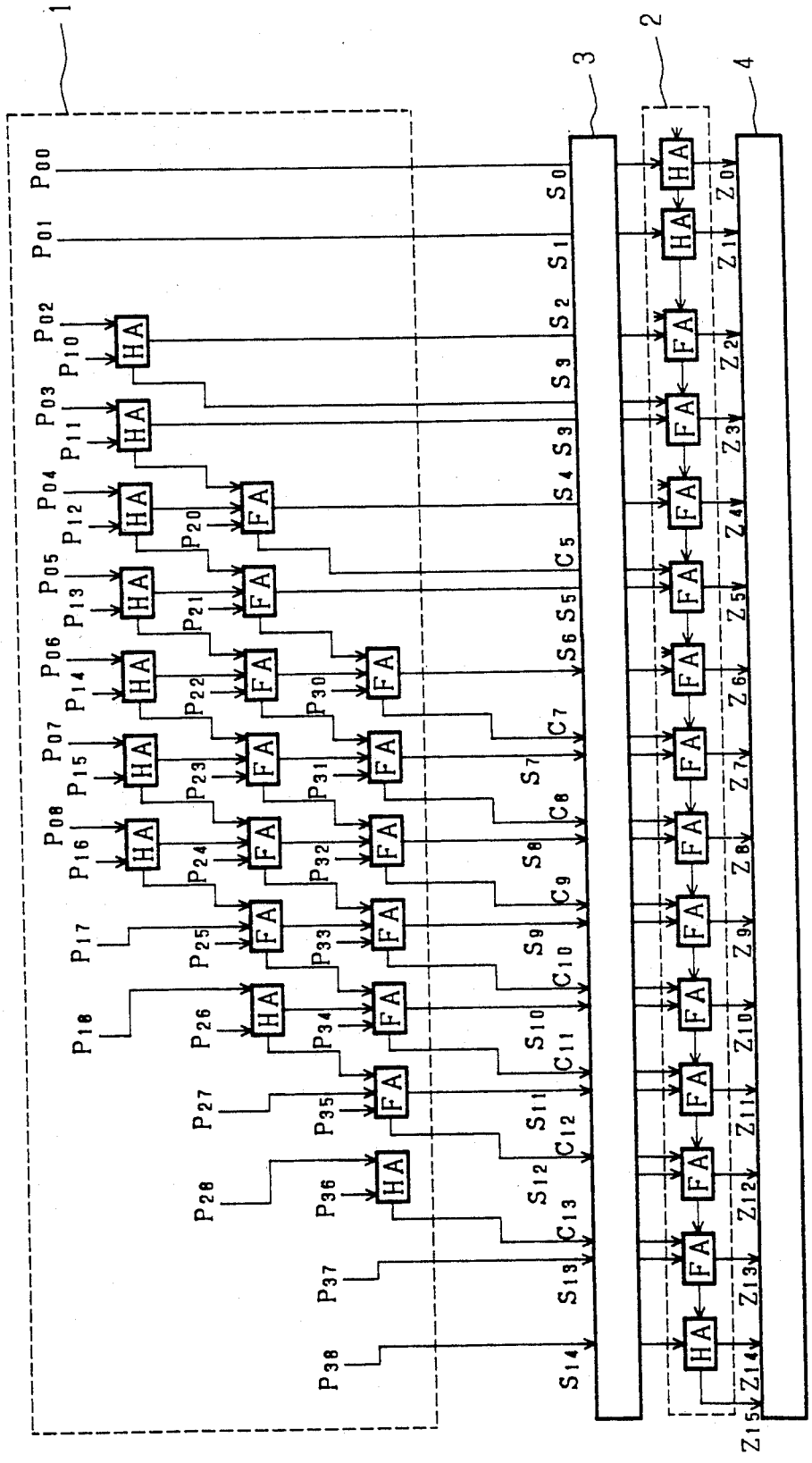
FIG. 1 is a block diagram showing an arrangement of a conventional multiplication circuit.

The present invention will be described with reference to the drawing showing a preferred embodiment thereof.

Figure 2:
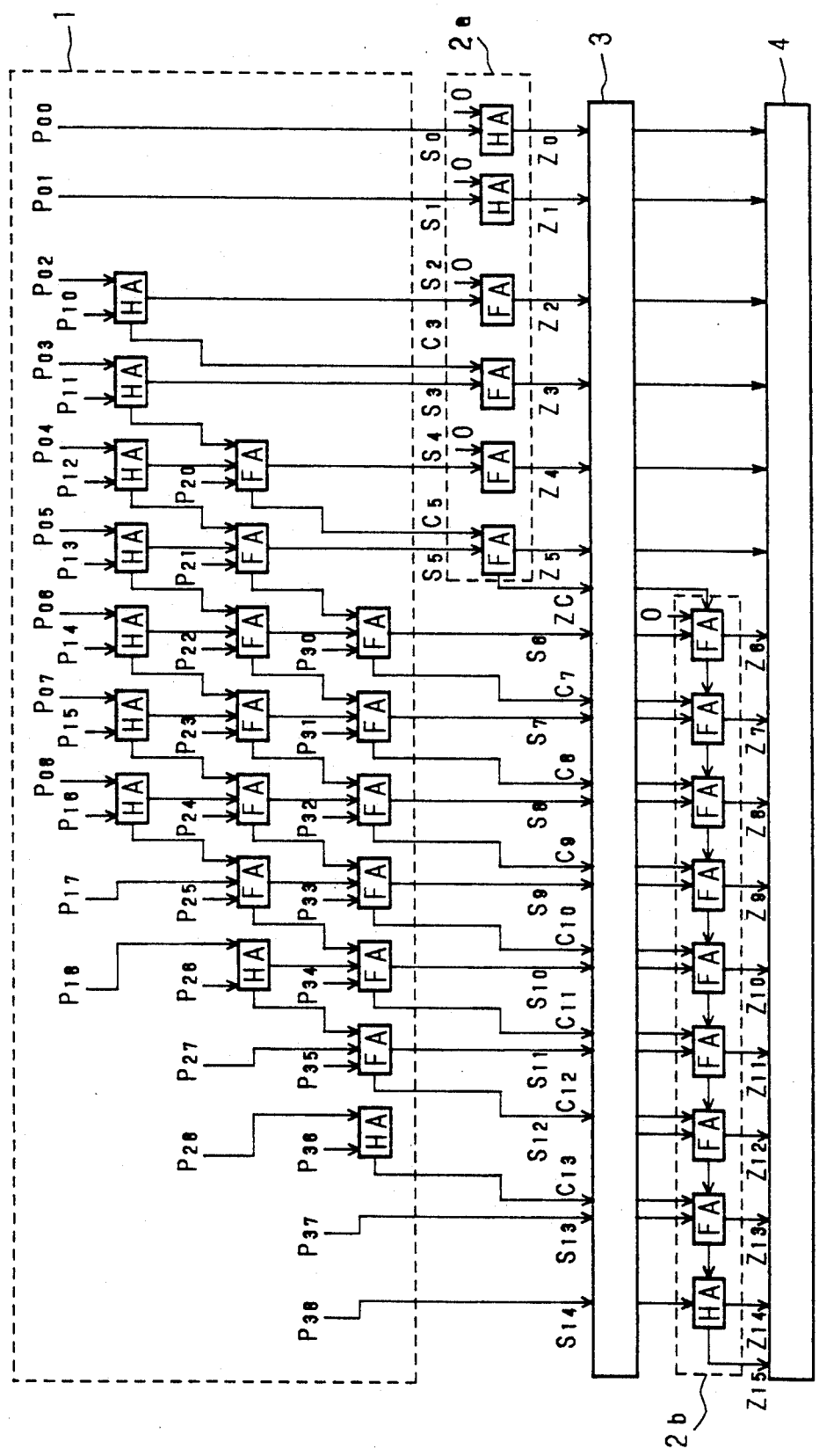
FIG. 2 is a block diagram showing an arrangement of a multiplication circuit according to the present invention.

FIG. 2 is a block diagram showing an arrangement of a multiplication circuit according to the present invention, which shows an example of an arrangement as an 8 bits×8 bits secondary Booth's multiplication circuit similarly to the conventional example.

In FIG. 2, the numeral 1 denotes a first adding circuit for calculating the intermediate sums of partial products. The lower six places of the outputs of the intermediate sums of partial products found in the first adding circuit 1 are directly given to a second adding circuit 2a for lower places group which will be described later, while other higher places are given to a first storing circuit 3.

The first storing circuit 3 stores the outputs from the first adding circuit 1, that is, the outputs of the higher places other than the lower six places of the outputs of the intermediate sums.

The signal 2a is the second adding circuit for lower places group for calculating the lower six places of the product output, which calculates the product output from the lower six places of the outputs of the intermediate sums found in the first adding circuit 1 as inputs. This product output from the second adding circuit 2a for lower places group and its final carry output ZC are stored in the first storing circuit 3.

The signal 2b is a second adding circuit for higher places group for calculating the higher places of the product output, which calculates the product output from the higher places other than the lower six places of the outputs of the intermediate sums found in the first adding circuit 1 and stored in the first storing circuit 3 as inputs. The output from the second adding circuit 2b for lower places group is stored in a second storing circuit 4 similarly to the output from the second adding circuit 2a for lower places group.

Both the first adding circuit 1 and the second adding circuit 2 comprise plural number of adders. In the drawing, characters HA and FA denote a half adder and a full adder respectively.

The operations of such a multiplication circuit of the present invention are as follows.

In FIG. 2, four partial products $P_{i8} P_{i7} \ldots P_{i0}$ (where i equals to 0, 1, 2, 3) found in accordance with Booth's algorithm are added in the first adding circuit 1 to obtain $S_j$, $C_j$ (j=0~14), the outputs of the intermediate sums of the partial products.

Among thus found outputs of the intermediate sums, signals $S_0$ to $S_5$ for the intermediate sums of the lower six places and carry signals $C_3$ to $C_5$ are given to the second adding circuit 2a for lower places group, while other intermediate sums $S_6$ to $S_{14}$ of other higher places and $C_7$ to $C_{13}$ are given to the first storing circuit 3 and stored temporarily. At this time, the lower six places of the outputs of the intermediate sums can be found faster than other higher places, so, product outputs $Z_0$ to $Z_5$ of the lower six places and a carry output ZC have also been calculated to be stored in the first storing circuit 3 by the time the higher places are calculated and their results are stored in the first storing circuit 3.

In this connection, the generation of partial products in the first adding circuit 1 as mentioned above and the operations in the second adding circuit 2a for lower places group are called the former-stage operations in the circuit according to the present invention. The time required for the former-stage operations in the circuit according to the present invention is, of course, shorter than the sum of the time required for the operations in the first adding circuit 1 and that required for the operations in the second adding circuit 2a for lower places group.

In the next place, the outputs of the inter mediate sums $S_6$ to $S_{14}$ of higher places stored in the first storing circuit 3 and $C_7$ to $C_{13}$, and the final carry output ZC are given to the second adding circuit 2b for higher places group to obtain the higher ten places $Z_6$ to $Z_{15}$ of the product output. And the product output of the higher ten places and the product outputs $Z_0$ to $Z_5$ in the second adding circuit 2a for lower places group are stored in the second storing circuit 4.

In the circuit according to the present invention, the operations in the second adding circuit 2b for higher places group are called the latter-stage operations.

In the latter-stage operation according to the present invention, the operations of the higher ten places alone among sixteen places of 8 bits×8 bits product outputs are carried out. Therefore, the time required for the latter-stage operations can be reduced in comparison to a conventional multiplication circuit. In other words, the difference between the processing time required for the former-stage operations and that required for the latter-stage operations is reduced, so that the whole processing time is shortened and the cycle can be made shorter when the pipeline processing is carried out.

In the embodiment mentioned above, the Booth's algorithm is utilized, and additions for obtaining the intermediate sums of partial products are carried out by the carry-save method. Other alternative methods, however, can also be used. Also in the embodiment mentioned above, the present invention is applied to an 8 bits×8 bits multiplication circuit. But it should not be limited to such multiplication circuit. Likewise the position for dividing the outputs of the intermediate sums should not be limited.

As mentioned above in detail, in the multiplication circuit according to the present invention, among the operations of the final addition for obtaining the product outputs, the additions of lower places are carried out in parallel with those for obtaining higher places of the intermediate sums of the partial products, so that a multiplication circuit capable of processing at a higher-speed can be realized. It is also possible to shorten the cycle when the pipeline processing is carried out. As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A circuit for improving calculation distribution in a pipelined multiplication circuit, the multiplication circuit producing a plurality of intermediate sums from a plurality of partial products generated from a first number and a second number to be multiplied together, with a sum of the plurality of partial products producing a value representative of a product of the first and second number, the circuit comprising:
   a first adding circuit for stepwise addition of a plurality of partial products disposed in columns to calculate a plurality of intermediate sums;
   a second adding circuit, having a first part, coupled to said first adding circuit, for forming a bit-area of a final product from a low-order group of said plurality of intermediate sums and a carry out of said bit-area, and a second part for forming a final product of the first and the second number from said plurality of intermediate sums; and
   a storing circuit coupled to said first and said second adding circuits, for receiving said bit-area and said carry-out from said first part of said second adding circuit and a high-order group of said plurality of intermediate sums from said first adding circuit, said high-order group not including intermediate sums from said low-order group, and for providing said bit-area, said carry-out and said high-order group to said second part of said second adding circuit.

2. The circuit as set forth in claim 1, wherein a pipeline processing is carried out with said first adding circuit and said second adding circuit.

3. The circuit as set forth in claim 1, wherein said first and second adding circuits comprise a secondary Booth's multiplication circuit.

* * * * *